United States Patent
Cheng et al.

(10) Patent No.: US 10,187,803 B2
(45) Date of Patent: Jan. 22, 2019

(54) SYSTEMS AND METHODS FOR CONTROLLING SCELL ON/OFF DURATIONS

(71) Applicant: Telefonaktiebolaget L M Ericsson (publ), Stockholm (SE)

(72) Inventors: Jung-Fu Cheng, Fremont, CA (US); Junaid Ansari, Aachen (DE); Laetitia Falconetti, Aachen (DE); Anders Furuskär, Stockholm (DE); Bruhtesfa Godana, Sandvika (NO); Du Ho Kang, Sollentuna (SE); Havish Koorapaty, Saratoga, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/754,220

(22) Filed: Jun. 29, 2015

(65) Prior Publication Data

US 2016/0119792 A1    Apr. 28, 2016

Related U.S. Application Data

(60) Provisional application No. 62/069,102, filed on Oct. 27, 2014.

(51) Int. Cl.
*H04W 72/00* (2009.01)
*H04W 16/14* (2009.01)
(Continued)

(52) U.S. Cl.
CPC ........... *H04W 16/14* (2013.01); *H04W 52/00* (2013.01); *H04W 72/0453* (2013.01);
(Continued)

(58) Field of Classification Search
CPC ..... H04L 5/001; H04L 5/0091; H04L 1/0026; H04L 5/0007; H04L 5/0048;
(Continued)

(56) References Cited

U.S. PATENT DOCUMENTS

2008/0227475 A1\* 9/2008 Suemitsu et al. ............. 455/513
2012/0282942 A1\* 11/2012 Uusitalo ............... H04W 16/14
455/452.2
(Continued)

FOREIGN PATENT DOCUMENTS

WO    2013063808 A1    5/2013
WO    2013071488 A1    5/2013

OTHER PUBLICATIONS

Almeida, Erika et al., "Enabling LTE/WiFi coexistence by LTE blank subframe allocation," Presented at the IEEE International Conference on Communications (ICC), Jun. 9-13, 2013, Budapest, Hungary, IEEE, p. 5083-5088.
(Continued)

*Primary Examiner* — Kathy Wang-Hurst
*Assistant Examiner* — B. M. M Hannan
(74) *Attorney, Agent, or Firm* — Withrow & Terranova, PLLC

(57) ABSTRACT

Systems and methods are disclosed for controlling ON/OFF operation of a Secondary Cell (SCell) in a cellular communications network. In some embodiments, the SCell is a License Assisted Access (LAA) SCell that operates in an unlicensed frequency band. In some embodiments, a method of operation of a network node in the cellular communications network to dynamically control ON/OFF operation of a SCell of the cellular communications network comprises measuring activity of other wireless systems on a channel utilized by a SCell while the SCell is in an OFF state, determining whether to transition the SCell to an ON state
(Continued)

based on the activity of the other wireless systems measured on the channel, turning the SCell ON upon determining that the SCell is to be transitioned to the ON state, and keeping the SCell in the OFF state upon determining that the SCell is not to be transitioned to the ON state.

20 Claims, 13 Drawing Sheets

(51) Int. Cl.
*H04W 52/00* (2009.01)
*H04W 72/04* (2009.01)
*H04W 76/15* (2018.01)
*H04W 72/12* (2009.01)

(52) U.S. Cl.
CPC .... *H04W 72/1215* (2013.01); *H04W 72/1221* (2013.01); *H04W 76/15* (2018.02)

(58) Field of Classification Search
CPC ... H04L 5/0053; H04L 5/0055; H04L 5/0057; H04W 24/10; H04W 72/0453; H04W 76/048; H04W 24/08; H04W 36/0088; H04W 52/0206; H04W 56/0005; H04W 72/0406; H04W 72/042; H04W 72/085; H04W 72/087; H04W 76/025; H04W 88/08; H04W 16/14; H04W 52/00; H04W 76/15; H04W 72/1221; H04W 72/1215; H04B 17/327
USPC ............... 455/67.14, 454; 370/329, 242, 252
See application file for complete search history.

(56) References Cited

U.S. PATENT DOCUMENTS

| | | | | |
|---|---|---|---|---|
| 2013/0083661 A1* | 4/2013 | Gupta et al. | ................... | 370/235 |
| 2013/0229931 A1* | 9/2013 | Kim | ...................... | H04W 24/10 370/252 |
| 2013/0237208 A1* | 9/2013 | Vujcic | ................ | H04B 7/15507 455/418 |
| 2013/0250908 A1* | 9/2013 | Bach | ................. | H04W 52/0206 370/331 |
| 2014/0126457 A1* | 5/2014 | Gou | ...................... | H04L 12/189 370/312 |
| 2014/0133428 A1* | 5/2014 | Kazmi | .................. | H04W 24/02 370/329 |
| 2014/0228013 A1* | 8/2014 | Yang | ................... | H04W 56/009 455/418 |
| 2014/0233409 A1* | 8/2014 | Lee | ....................... | H04W 24/08 370/252 |
| 2014/0307582 A1* | 10/2014 | Dalsgaard et al. | ........... | 370/254 |
| 2015/0065152 A1* | 3/2015 | Sadek | ............... | H04W 72/0453 455/450 |
| 2015/0078261 A1* | 3/2015 | Yu et al. | ....................... | 370/329 |
| 2015/0141016 A1* | 5/2015 | Wang | .................. | H04W 76/025 455/436 |
| 2015/0163801 A1* | 6/2015 | Sadek | ............... | H04W 72/0446 370/336 |
| 2015/0195062 A1* | 7/2015 | Hwang | ................. | H04L 1/1607 370/329 |
| 2015/0208372 A1* | 7/2015 | You et al. | ......... | H04W 56/0005 |
| 2015/0223243 A1* | 8/2015 | Tabet et al. | ....... | H04W 72/0453 |
| 2015/0304915 A1* | 10/2015 | Uchino | ................. | H04W 72/04 370/329 |
| 2015/0341838 A1* | 11/2015 | Pinheiro | ........... | H04W 52/0251 455/449 |
| 2016/0029245 A1* | 1/2016 | Hong | ................ | H04W 28/0278 370/329 |
| 2016/0037405 A1* | 2/2016 | Choi | ..................... | H04W 16/32 455/444 |

OTHER PUBLICATIONS

Author Unknown, "Technical Specification Group Radio Access Network; Evolved Universal Terrestrial Radio Access (E-UTRA); Physical layer procedures (Release 11)," Technical Specification 36.213, Version 11.4.0, 3GPP Organizational Partners, Sep. 2013, 182 pages.

CATT, "R1-143751: Required functionalities for Licensed-Assisted Access Using LTE," Third Generation Partnership Project (3GPP) TSG RAN WG1 Meeting #78bis, Oct. 6-10, 2014, Ljubljana, Slovenia, 4 pages.

Ericsson, "R1-144267: Initial discussion on solutions for identified LAA functionalities," Third Generation Partnership Project (3GPP) TSG RAN WG1 Meeting #78bis, Oct. 6-10, 2014, Ljubljana, Slovenia, 3 pages.

International Search Report and Written Opinion for International Patent Application No. PCT/IB2015/054927, dated Sep. 7, 2015, 10 pages.

International Preliminary Report on Patentability for International Patent Application No. PCT/IB2015/054927, dated May 11, 2017, 8 pages.

\* cited by examiner

SYSTEMS AND METHODS FOR CONTROLLING SCELL ON/OFF DURATIONS

RELATED APPLICATIONS

This application claims the benefit of provisional patent application Ser. No. 62/069,102, filed Oct. 27, 2014, the disclosure of which is hereby incorporated herein by reference in its entirety.

TECHNICAL FIELD

This disclosure pertains to dynamic Licensed Assisted Access (LAA) Secondary Cell (SCell) operations, and more particularly, to LAA SCell operations with an early turn-off credit application.

BACKGROUND

In order to cope with tremendously growing wireless data traffic in recent years, wireless operators and equipment manufacturers have been exploring different options to address high traffic areas with more bandwidth. One option is adapting Third Generation Partnership Project (3GPP) Long Term Evolution (LTE) to operate in the unlicensed band, which combines the robust operation benefits of LTE with the large amount of additional available bandwidth. Furthermore, the system can be controlled by one core network and thus requires low operational expenses.

However, existing technologies other than LTE are already operating in the unlicensed band. It is therefore necessary to devise coexistence solutions to ensure fair sharing among LTE and other wireless technologies in the unlicensed band.

LTE Overview

LTE uses Orthogonal Frequency Division Multiplexing (OFDM) in the downlink and Discrete Fourier Transform (DFT) spread OFDM (also referred to as Single Carrier Frequency Division Multiple Access (SC-FDMA)) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

As illustrated in FIG. 2, in the time domain, LTE downlink transmissions are organized into radio frames of 10 milliseconds (ms), each radio frame consisting of ten equally-sized subframes of length $T_{subframe}=1$ ms. For normal cyclic prefix, one subframe consists of 14 OFDM symbols. The duration of each OFDM symbol is approximately 71.4 microseconds (μs).

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled; that is, in each subframe, the base station transmits control information about to which terminal's data is transmitted and upon which resource blocks the data is transmitted, in the current downlink subframe. This control signaling is typically transmitted in the first 1, 2, 3, or 4 OFDM symbols in each subframe and the number n=1, 2, 3, or 4 is known as the Control Format Indicator (CFI). The downlink subframe also contains common reference symbols, which are known to the receiver and used for coherent demodulation of, e.g., the control information. A downlink system with CFI=3 OFDM symbols as control is illustrated in FIG. 3.

The reference symbols shown in FIG. 3 are the Cell specific Reference Symbols (CRS) and are used to support multiple functions including fine time and frequency synchronization and channel estimation for certain transmission modes.

Carrier Aggregation

The LTE Release 10 standard (and subsequent releases) supports bandwidths larger than 20 Megahertz (MHz). One important requirement on LTE Release 10 is to assure backward compatibility with LTE Release 8. This backward compatibility should also include spectrum compatibility. That would imply that an LTE Release 10 carrier that is wider than 20 MHz should appear as a number of LTE carriers to an LTE Release 8 terminal. Each such carrier can be referred to as a Component Carrier (CC). In particular, for early LTE Release 10 deployments, it can be expected that there will be a smaller number of LTE Release 10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Release 10 carrier. The straightforward way to obtain this would be by means of Carrier Aggregation (CA). CA implies that an LTE Release 10 terminal can receive multiple CCs, where the CCs have, or at least the possibility to have, the same structure as a LTE Release 8 carrier. CA is illustrated in FIG. 4. A CA-capable User Equipment device (UE) is assigned a Primary Cell (PCell), which is always activated, and one or more Secondary Cells (SCells), which can be activated or deactivated dynamically.

The number of aggregated CCs as well as the bandwidth of the individual CCs may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal. A terminal may, for example, support more downlink CCs than uplink CCs, even though the cell is configured with the same number of uplink and downlink CCs.

A UE is first connected to the LTE system via the PCell. The network can then configure the UE to aggregate additional SCell(s). The SCell configuration for activation and deactivation is carried out via Radio Resource Control (RRC) signaling, which typically takes tens of milliseconds.

A configured SCell can be further put into one of two states, namely, activated or deactivated. For an activated SCell, the UE monitors the SCell in order to maintain time/frequency synchronization, monitor control channels, and report Channel Quality/State Information (CQI/CSI) back to the network. For a deactivated SCell, the UE might not monitor the SCell. The activation and deactivation commands are sent by Medium Access Control (MAC) elements, and the UE can apply these commands quickly.

Wireless Local Area Network

In typical deployments of a Wireless Local Area Network (WLAN), Carrier Sense Multiple Access with Collision Avoidance (CSMA/CA) is used. This means that the channel is sensed, and only if the channel is declared as Idle, a transmission is initiated. In case the channel is declared as Busy, the transmission is essentially deferred until the channel is found Idle. When the range of several Access Points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded. A general illustration of the Listen-Before-Talk (LBT) mechanism is shown in FIG. 5.

Licensed Assisted Access to Unlicensed Spectrum Using LTE

The spectrum used by LTE is dedicated to LTE. This spectrum dedication has the advantage that the LTE system does not need to care about the coexistence issue and the spectrum efficiency can be maximized. However, unlicensed spectrum can, by definition, be simultaneously used by multiple different technologies. Therefore, when using unlicensed spectrum, LTE would need to consider the coexistence issue with other systems such as IEEE 802.11 (Wi-Fi).

In the License Assisted Access (LAA) framework, as shown in FIG. 6, a UE is connected to a PCell in the licensed band and one or more SCells in the unlicensed band. In this application, a SCell in unlicensed spectrum is denoted as a LAA SCell. Under this LAA framework, the PCell retains the mobility and high layer control while the LAA SCell is geared towards serving the best effort user data. The PCell is supposed to also serve UEs when the unlicensed SCell is unavailable.

Therefore, systems and methods for enabling sharing of unlicensed spectrum between LTE and other wireless technologies (e.g., Wi-Fi) are desired.

SUMMARY

Systems and methods are disclosed for controlling ON/OFF operation of a Secondary Cell (SCell) in a cellular communications network. In some embodiments, the SCell is a License Assisted Access (LAA) SCell that operates in an unlicensed frequency band. Embodiments of a method of operation of a network node in cellular communications network to dynamically control ON/OFF operation of a SCell of the cellular communications network are disclosed. In some embodiments, the method of operation of the network nodes comprises measuring activity of other wireless systems on a channel utilized by a SCell while the SCell is in an OFF state, determining whether to transition the SCell to an ON state based on the activity of the other wireless systems measured on the channel, turning the SCell ON upon determining that the SCell is to be transitioned to the ON state, and keeping the SCell in the OFF state upon determining that the SCell is not to be transitioned to the ON state. In this manner, the SCell may be turned to the ON state when, for example, the activity on the channel is low and, e.g., there is data to be transmitted on the SCell.

In some embodiments, the SCell is a LAA SCell.

In some embodiments, measuring the activity of the other wireless systems on the channel comprises measuring an average received energy for the channel. In some embodiments, measuring the activity of the other wireless systems on the channel comprises measuring a channel occupancy ratio for the channel.

In some embodiments, determining whether to transition the SCell to the ON state comprises determining whether to transition the SCell to the ON state based on the activity of the other wireless systems measured on the channel and an amount of data buffered for the SCell. In some embodiments, determining whether to transition the SCell to the ON state based on the activity of the other wireless systems measured on the channel and an amount of data buffered for the SCell is such that a determination is made to transition the SCell to the ON state if the amount of data buffered for the SCell is greater than or equal to a predefined buffered data threshold and the activity of the other wireless systems measured on the channel is less than a predefined channel activity threshold.

In some embodiments, determining whether to transition the SCell to the ON state comprises determining whether to transition the SCell to the ON state based on the activity of the other wireless systems measured on the channel, an amount of data buffered for the SCell, and a static maximum OFF duration.

In some embodiments, determining whether to transition the SCell to the ON state comprises determining whether to transition the SCell to the ON state based on the activity of the other wireless systems measured on the channel, an amount of data buffered for the SCell, and a dynamic maximum OFF duration. In some embodiments, the dynamic OFF duration is a function of whether an immediately preceding ON duration of the SCell was ended prior to a maximum ON duration.

In some embodiments, the method further comprises, while the SCell is in the ON state, determining whether an accumulated ON duration for the SCell is less than a maximum ON duration and turning the SCell OFF upon determining that the accumulated ON duration for the SCell is not less than the maximum ON duration.

In some embodiments, the method further comprises, while the SCell is in the ON state, determining whether to transition the SCell to the OFF state based on an amount of data buffered for the SCell and an accumulated ON duration of the SCell, turning the SCell OFF upon determining that that SCell is to be transitioned to the OFF state, and keeping the SCell in the ON state upon determining that the SCell is not to be transitioned to the OFF state.

In some embodiments, measuring the activity of other wireless systems on the channel comprises measuring the activity of other wireless systems on the channel during an OFF duration increment, the OFF duration increment being less than a maximum OFF duration. Further, determining whether to transition the SCell to the ON state comprises determining whether an amount of data buffered for the SCell is greater than or equal to a predefined buffered data threshold, determining whether an accumulated OFF duration for the SCell is greater than to equal to the maximum OFF duration, and determining whether the activity of the other wireless systems on the channel is less than a predefined channel activity threshold. Still further, turning the SCell to the ON state comprises turning the SCell to the ON state upon determining that: (i) the amount of data buffered for the SCell is greater than or equal to the predefined buffered data threshold and (ii) either the accumulated OFF duration for the SCell is greater than or equal to the maximum OFF duration or the activity of the other wireless systems on the channel is less than the predefined channel activity threshold.

In some embodiments, keeping the SCell in the OFF state comprises keeping the SCell in the OFF state for an additional OFF duration increment upon determining that: (i) the amount of data buffered for the SCell is not greater than or equal to the predefined buffered data threshold or (ii) the accumulated OFF duration for the SCell is not greater than or equal to the maximum OFF duration and the activity of the other wireless systems on the channel is not less than the predefined channel activity threshold. In some embodiments, the method further comprises repeating the steps of measuring activity of other wireless systems on the channel and determining whether to transition the SCell to the ON state for the additional OFF duration increment.

In some embodiments, the maximum OFF duration is static.

In some embodiments, the method further comprises, while the SCell is in the ON state, determining whether an accumulated ON duration for the SCell is less than a maximum ON duration and turning the SCell OFF upon determining that the accumulated ON duration for the SCell is not less than the maximum ON duration.

In some embodiments, the method further comprises, while the SCell is in the ON state, determining whether an amount of data buffered for the SCell is greater than or equal to a predefined ON state buffered data threshold; determining whether an accumulated ON duration for the SCell is less than a maximum ON duration upon determining that the amount of data buffered for the SCell is greater than or equal to the predefined ON state buffered data threshold; turning the SCell OFF upon determining that either: (i) the amount of data buffered for the SCell is not greater than or equal to the predefined ON state buffered data threshold or (ii) the accumulated ON duration for the SCell is not less than the maximum ON duration; and keeping the SCell in the ON state upon determining that the amount of data buffered for the SCell is greater than or equal to the predefined ON state buffered data threshold and the accumulated ON duration for the SCell is less than the maximum ON duration.

In some embodiments, the method further comprises, while the SCell is in the ON state, determining whether an amount of data buffered for the SCell is greater than or equal to a predefined ON state buffered data threshold; determining whether an accumulated ON duration for the SCell is less than a maximum ON duration upon determining that the amount of data buffered for the SCell is greater than or equal to the predefined ON state buffered data threshold; turning the SCell OFF and calculating the maximum OFF duration for the SCell upon determining that either: (i) the amount of data buffered for the SCell is not greater than or equal to the predefined ON state buffered data threshold or (ii) the accumulated ON duration for the SCell is not less than the maximum ON duration, the maximum OFF duration being calculated such that maximum OFF duration is inversely related to a difference between the maximum ON duration and the accumulated ON duration of the SCell upon turning the SCell OFF; and keeping the SCell in the ON state upon determining that the amount of data buffered for the SCell is greater than or equal to the predefined ON state buffered data threshold and the accumulated ON duration for the SCell is less than the maximum ON duration.

In some embodiments, the method further comprises, while the SCell is in the ON state, determining whether an amount of data buffered for the SCell is greater than or equal to a predefined ON state buffered data threshold; determining whether an accumulated ON duration for the SCell is less than a maximum ON duration upon determining that the amount of data buffered for the SCell is greater than or equal to the predefined ON state buffered data threshold; turning the SCell OFF and calculating the maximum ON duration for the LA SCell and the maximum OFF duration for the SCell upon determining that either: (i) the amount of data buffered for the SCell is not greater than or equal to the predefined ON state buffered data threshold or (ii) the accumulated ON duration for the SCell is not less than the maximum ON duration, the maximum ON duration being calculated such that maximum ON duration is directly related to a difference between the maximum ON duration and the accumulated ON duration of the SCell upon turning the SCell OFF and the maximum OFF duration being calculated such that maximum OFF duration is inversely related to the difference between the maximum ON duration and the accumulated ON duration of the SCell upon turning the SCell OFF; and keeping the SCell in the ON state upon determining that the amount of data buffered for the SCell is greater than or equal to the predefined ON state buffered data threshold and the accumulated ON duration for the SCell is less than the maximum ON duration.

Embodiments of a network node are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
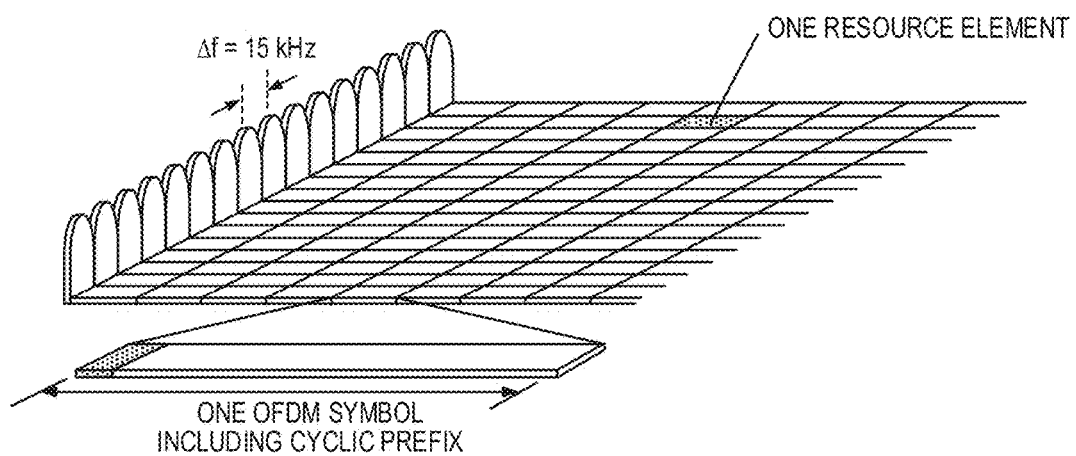
FIG. 1 is a schematic diagram of an example Long Term Evolution (LTE) downlink physical resource.
Figure 2:
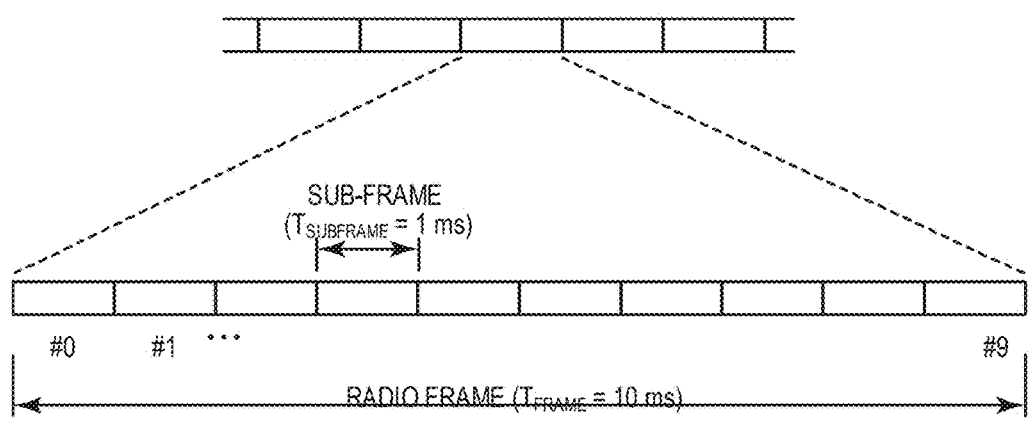
FIG. 2 is a schematic diagram of an example LTE time domain structure.
Figure 3:
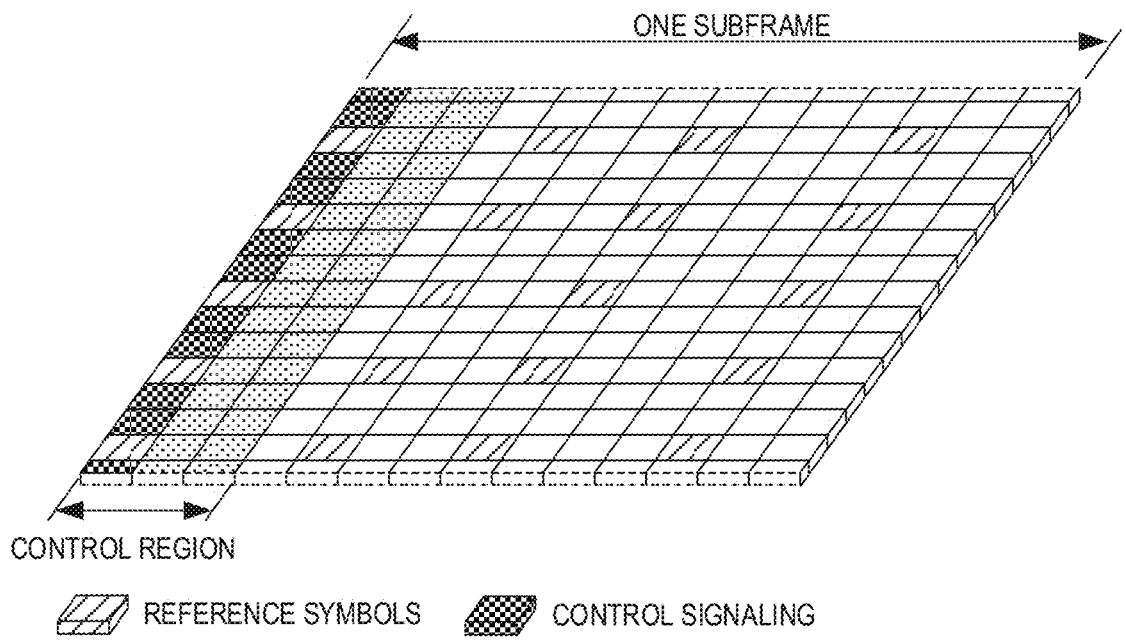
FIG. 3 is a schematic diagram of an example LTE downlink subframe.
Figure 4:
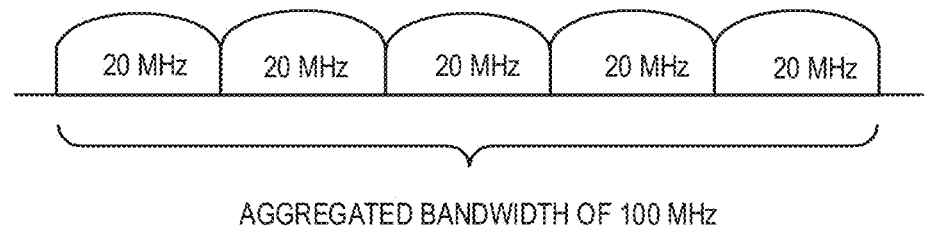
FIG. 4 is a schematic diagram of an example of Carrier Aggregation (CA)
Figure 5:
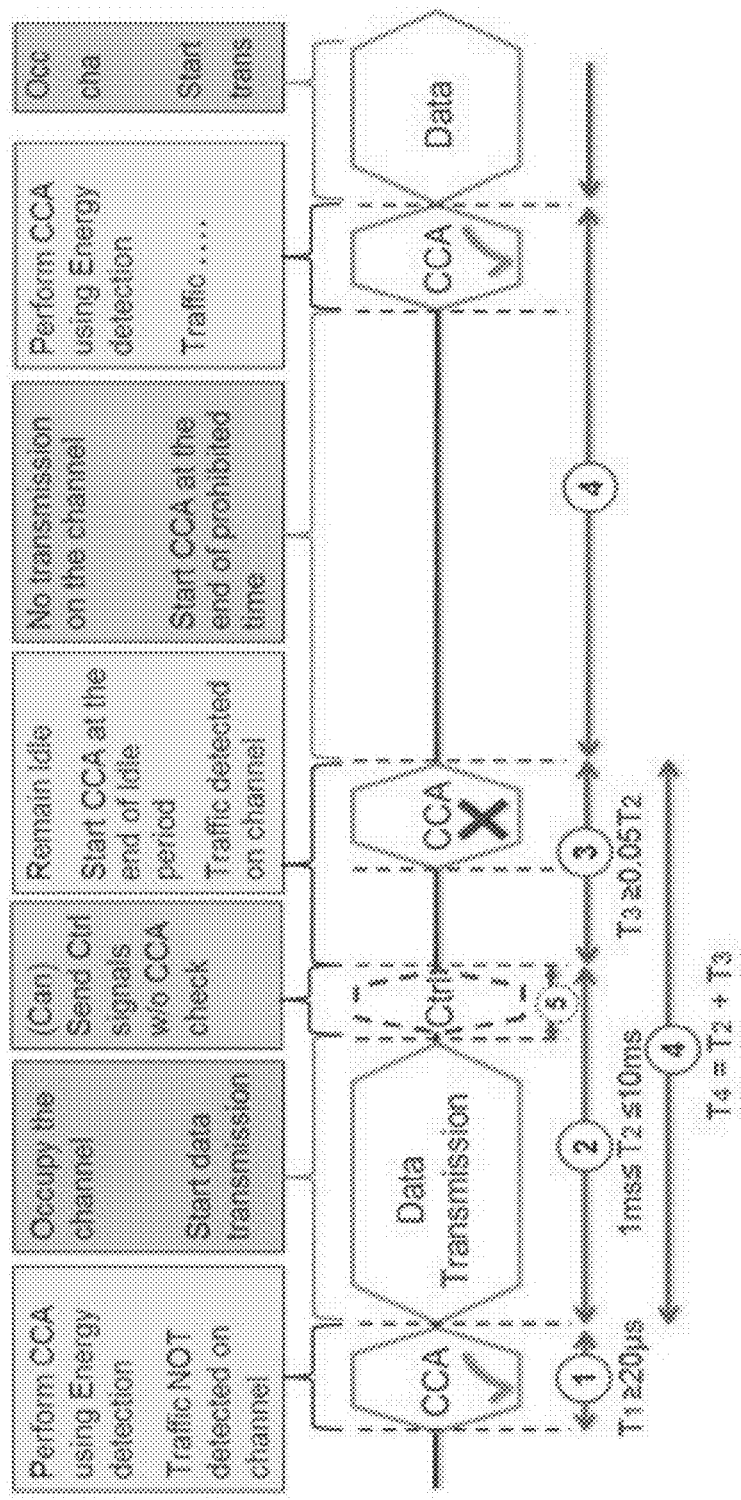
FIG. 5 is an illustration of a Listen-Before-Talk (LBT) mechanism.
Figure 6:
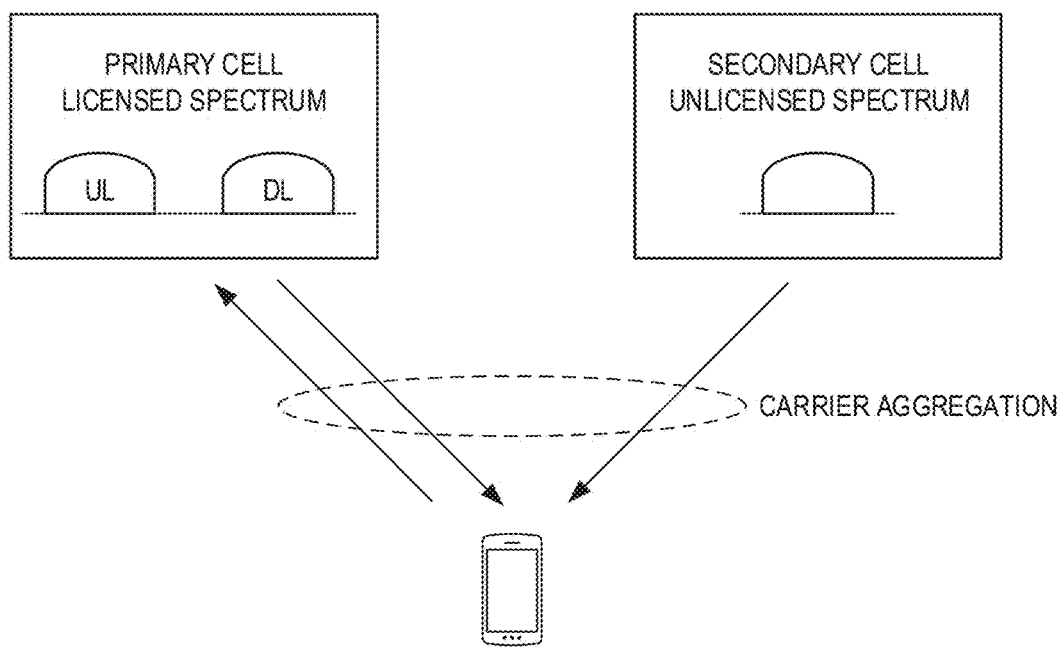
FIG. 6 is a schematic diagram of an example of Licensed Assisted Access (LAA) to an unlicensed spectrum using LTE CA.
Figure 7:
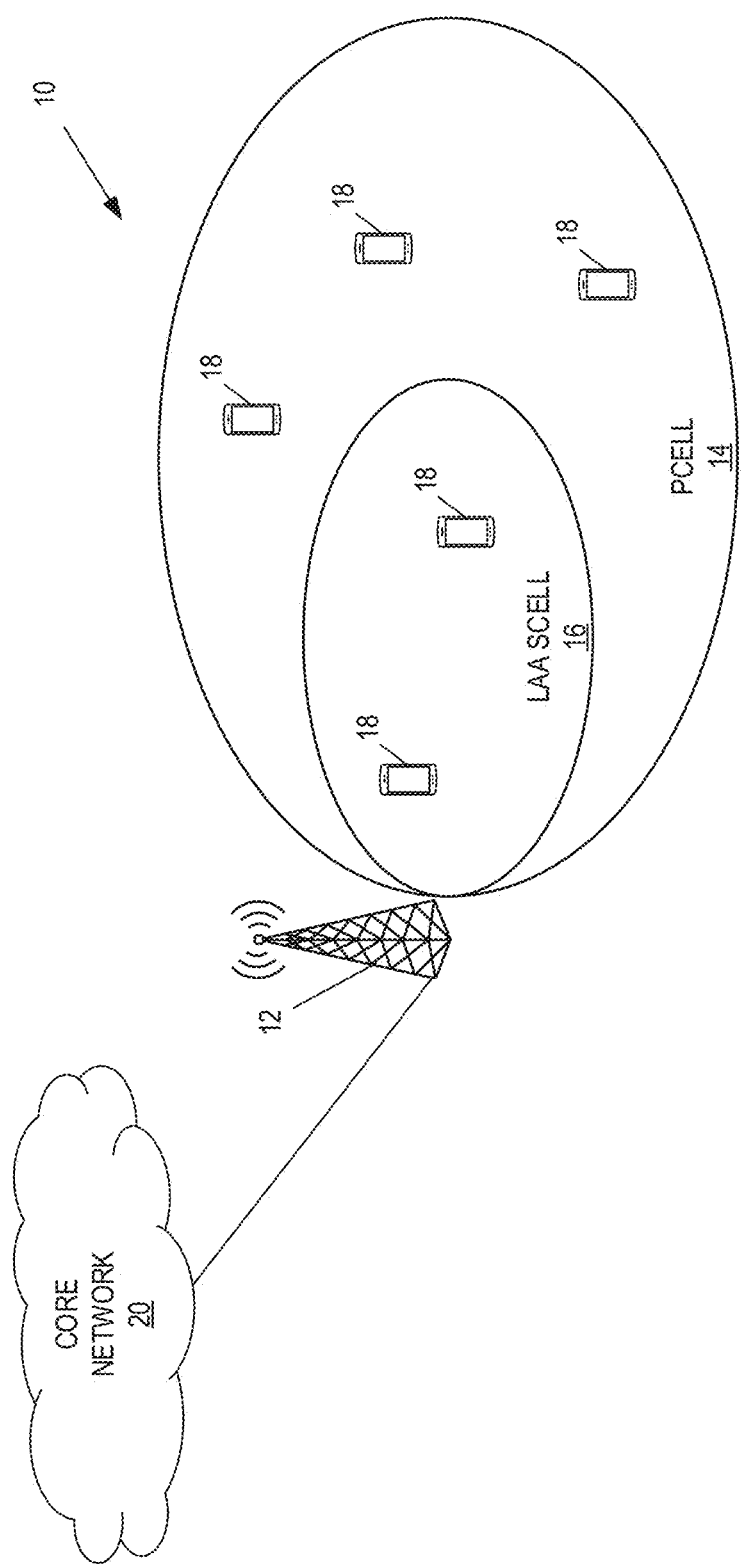
FIG. 7 is a schematic diagram of a communications system in which an ON/OFF scheme of a LAA Secondary Cell (SCell) is controlled to enable coexistence in the unlicensed spectrum between LTE and other wireless technologies in accordance with embodiments of the present disclosure.

Systems and methods are disclosed for controlling ON/OFF operation of a License Assisted Access (LAA) Secondary Cell (SCell) in a cellular communications network. In this regard, FIG. 7 illustrates one example of a cellular communications network 10 according to some embodiments of the present disclosure. The discussion herein focuses on embodiments in which the cellular communications network 10 is a Long Term Evolution (LTE) network and, as such, LTE terminology is sometimes used. However, the present disclosure is not limited to LTE. In this example, the cellular communications network 10 includes a base station 12, which in LTE is referred to as an enhanced or evolved Node B (eNB), controlling a Primary Cell (PCell) 14 and a SCell 16. While only one SCell 16 is illustrated, the base station 12 may control multiple SCells 16. The PCell 14 and the SCell 16 operate on different carrier frequencies. In particular, in this example, the PCell 14 operates on a carrier in a licensed frequency band (i.e., in the frequency spectrum dedicated for the cellular communications network 10), and the SCell 16 operates on a carrier in an unlicensed frequency band (e.g., the 5 Gigahertz (GHz) frequency spectrum) according to a LAA scheme. As such, the SCell 16 is also referred to herein as a LAA SCell 16. Wireless devices 18, which in LTE are referred to as User Equipment devices (UEs), are served by the PCell 14 and the LAA SCell 16. The base station 12 is connected to a core network 20. Notably, the base station 12 is sometimes referred to herein as eNB 12, and the wireless devices 18 are sometimes referred to herein as UEs 18.

Notably, the architecture of FIG. 7 is only an example. For instance, while in this example the LAA SCell 16 is controlled by the base station 12, the LAA SCell 16 may alternatively be controlled by another radio access node (e.g., a low power base station such as, e.g., a pico eNB) or be provided by a remote radio access node (e.g., a Remote Radio Head (RHH) controlled by the base station 12).

Importantly, the cellular communications network 10 of FIG. 7 is only an example. The concepts disclosed herein are equally applicable to, e.g., other network architectures. Further, while the discussion herein focuses on LTE, the concepts disclosed herein are equally applicable to other types of wireless technologies (e.g., other types of cellular radio access technologies) that utilize an ON/OFF scheme for radio access nodes or cells and that operate in an unlicensed frequency band. Still further, while the discussion herein focuses on LAA SCell(s) 16 operating in an unlicensed frequency band, it should be understood that all of the embodiments disclosed herein are equally applicable to SCell(s) operating in the licensed frequency band (i.e., non-LAA SCells).

Figure 8A:
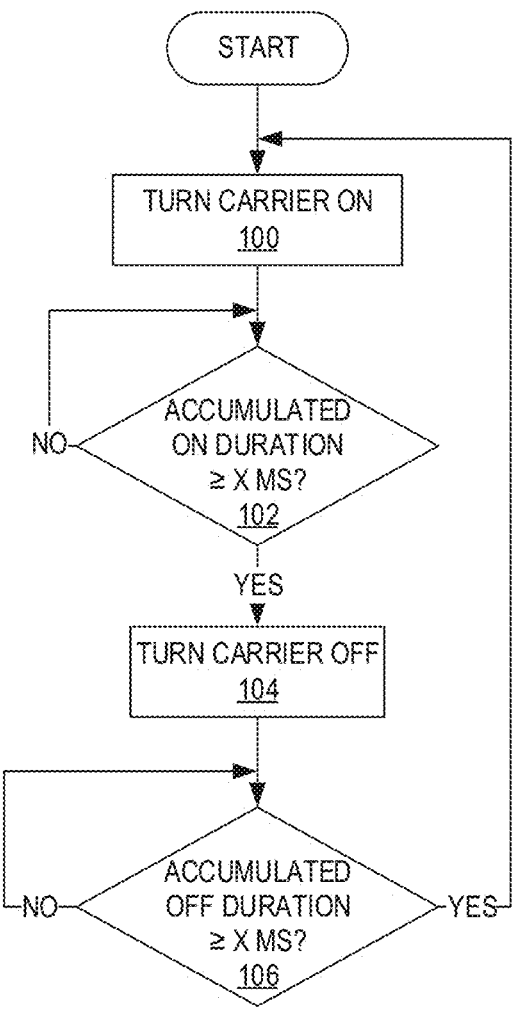
FIG. 8A is a flowchart illustrating a process for controlling periodic ON/OFF operation of a LAA SCell.

One possible way to share the unlicensed spectrum is to turn OFF the LAA SCell 16 periodically to allow other wireless technologies to utilize the spectrum (see Erika Almeida et al., "Enabling LTE/WiFi coexistence by LTE blank subframe allocation," 2013 IEEE International Conference on Communications, pages 5083-5088, Jun. 9-13, 2013). Under the LAA framework, this can be achieved using SCell activation and deactivation commands. A process for controlling a LAA SCell 16 according to the periodic ON/OFF scheme is illustrated in FIG. 8A. As illustrated, at some point, the LAA SCell 16 is turned ON (step 100). In other words, transmission on the LAA SCell 16, including Cell Specific Reference Symbol (CRS), is turned ON. The network can send SCell activation commands from the PCell 14 to the UE(s) 18 to start monitoring the LAA SCell 16 that is now turned ON. That UE(s) 18 can then be scheduled to receive or transmit data on the LAA SCell 16. The network maintains this ON state of the LAA SCell 16 for a predetermined period, or amount of time, which is referred to herein as a predetermined, or predefined, ON duration, which in FIG. 8A is indicated as X milliseconds (ms).

When the predetermined ON duration is exhausted (step 102; YES), the network sends SCell deactivation commands to the UE(s) 18 indicating that the UE(s) 18 are to stop monitoring the LAA SCell 16. After all the UEs 18 stop monitoring the LAA SCell 16, the network can then turn the LAA SCell 16 OFF (step 104). In other words, the network turns the carrier of the LAA SCell 16 OFF such that all transmissions (including CRS) on the LAA SCell 16 are turned OFF. The network maintains this OFF state of the LAA SCell 16 for a predetermined period, which is referred to herein as an OFF duration. When the OFF duration is exhausted (step 106; YES), the network goes back to step 100 to turn the LAA SCell 16 ON.

Figure 8B:
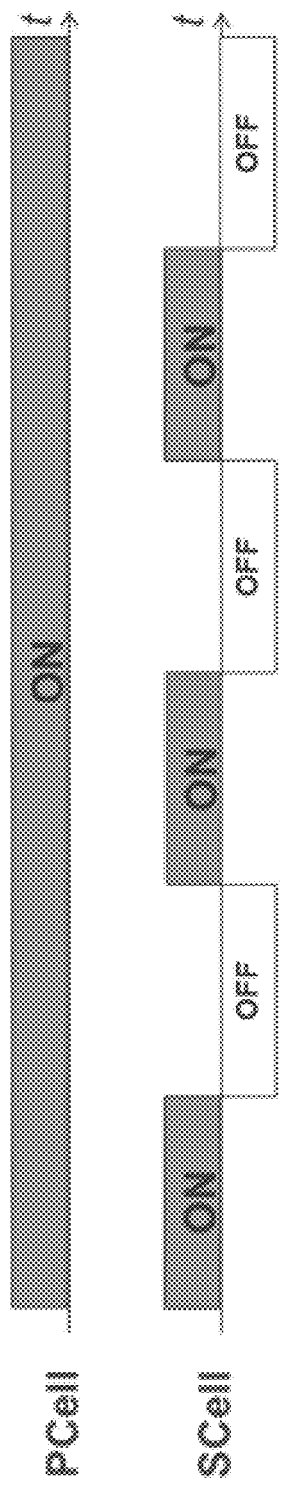
FIG. 8B is a schematic diagram of the periodic ON/OFF operation of a LAA SCell in accordance with the process of FIG. 8A.

This periodic ON/OFF operation for the LAA SCell 16 to achieve unlicensed band coexistence is illustrated in FIG. 8B. It is further noted that the PCell 14 is always ON. In other words, FIG. 8B is a schematic diagram of the periodic ON/OFF operation of the LAA SCell 16 in accordance with the process of FIG. 8A. As illustrated, the PCell 14 remains ON. Hence, user data can still be served from the PCell 14 during the OFF period of the LAA SCell 16.

It is observed that certain system-essential signals are transmitted continuously on the LAA SCell 16 in the ON state. These signals are present even when the network does not have any user data to transmit. These signals then cause unnecessary interference to other wireless systems operating on the same frequency band. Furthermore, the network has to maintain the LAA SCell 16 in the OFF state for the predetermined period of time (i.e., for the OFF duration) even when other technologies are not using the frequency channel. Therefore, a large amount of buffered data is built up for the LAA SCell 16 (uplink and/or downlink) while the LAA SCell 16 is OFF, and this large amount of buffered data cannot be served quickly using only the PCell 14. Therefore, there is a need for systems and methods for controlling the ON/OFF state of the LAA SCell 16 in such a manner as to reduce interference resulting from transmission of system-essential signals in the ON state when there is little or no user data transmitted and/or to mitigate the build-up of a large amount of buffered data for the LAA SCell 16 when operating in the OFF state even when there is little or no use of the channel by other wireless technologies.

As described herein, the network (e.g., a network node such as, e.g., a base station 12) adjusts an OFF duration and/or an ON duration of the LAA SCell 16 to, e.g., achieve high performance for LAA and better coexistence with other wireless systems in the unlicensed spectrum. In some embodiments, the adjustment(s) consider channel usage activities, data buffer status, and/or credits for turning OFF early.

In some embodiments, the network (e.g., a network node such as, e.g., a base station 12) adjusts the OFF duration of the LAA SCell 16 based on dual adjustment criteria, namely, an amount of buffered data for the LAA SCell 16 (for the downlink and/or the uplink) and an activity level on the channel utilized by the LAA SCell 16 by other wireless technologies (i.e., other wireless systems). As used herein, other wireless systems are wireless systems that utilize other radio access technologies. For example, if the cellular communications network 10 is a LTE network, then the other wireless technologies are technologies other than LTE (e.g., Wi-Fi, Bluetooth, etc.) and, likewise, the other wireless systems are wireless systems that operate using these other wireless technologies. In some embodiments, if the amount of buffered data for the LAA SCell 16 (e.g., at the eNB 12 controlling the LAA SCell 16 or the UE(s) 18 served by the LAA SCell 16) is below a threshold referred to as offBufferThreshold, the network maintains the LAA SCell 16 in the OFF state. The purpose is to allow other wireless technologies to use the unlicensed band when there is no traffic or when traffic can be served by the PCell 14 alone.

In embodiments where the LAA SCell 16 is controlled by the eNB 12, the amount of buffered downlink data for the LAA SCell 16 at the eNB 12 is directly available at the eNB 12. The amount of buffered uplink data for the LAA SCell 16 at the UE(s) 18 is calculated by the network (e.g., by a network node such as, e.g., the eNB 12) from buffer status reports from the UEs 18.

The offBufferThreshold is configurable (e.g., by the network or network operator) and can be set to zero to utilize the LAA SCell 16 as much as possible. The offBufferThreshold can be set based on the long term system statistics. In some embodiments, the offBufferThreshold is configured considering the relative bandwidth of the PCell 14 and the LAA SCell(s) 16. For example, a small offBufferThreshold is set when there is more bandwidth available in the unlicensed spectrum. In some embodiments, the offBufferThreshold is set considering the relative load levels on the PCell 14 and the LAA SCell(s) 16. For example, a high offBufferThreshold is set when the PCell 14 is heavily loaded with traffic. In some embodiments, the offBufferThreshold is set considering the relative interference levels on the PCell 14 and the LAA SCell(s) 16. For example, a high offBufferThreshold is set when the PCell 14 is experiencing a high interference level.

The network monitors the channels and updates activity metrics periodically during the LAA SCell 16 OFF duration. If the channel activity metrics are below certain thresholds, the network can turn the LAA SCell 16 ON. Otherwise, the network maintains the LAA SCell 16 in the OFF state for another offDurationIncrement. The maximum duration of LAA SCell 16 OFF when the network needs to use the LAA SCell 16 for data transmission is maxOffDuration. The purpose is to allow the network to use the LAA SCell 16 when there is no or low activities from other wireless systems and to avoid accessing the unlicensed frequencies when there are high activities detected/monitored in the available channels.

One non-limiting activity metric is the average received energy for a particular channel. Let $t_i$ denote the measurement duration for the i-th measurement and $P_i$ denote the received power during the i-th measurement. The average energy metric can be calculated as, $$AverageEnergy = \frac{\sum_i t_i P_i}{\sum_i t_i}$$

Another non-limiting channel activity metric is the average channel occupancy ratio. Let $O_i=1$ denote that the channel is occupied during the i-th measurement and $O_i=0$ denote that the channel is not occupied during the i-th measurement. The average channel occupancy ratio can be calculated as, $$AverageChannelOccupancy = \frac{\sum_i t_i O_i}{\sum_i t_i}$$

$O_i$ can be determined by checking whether the received power $P_i$ is higher or lower than a configurable threshold value.

Figure 9A:
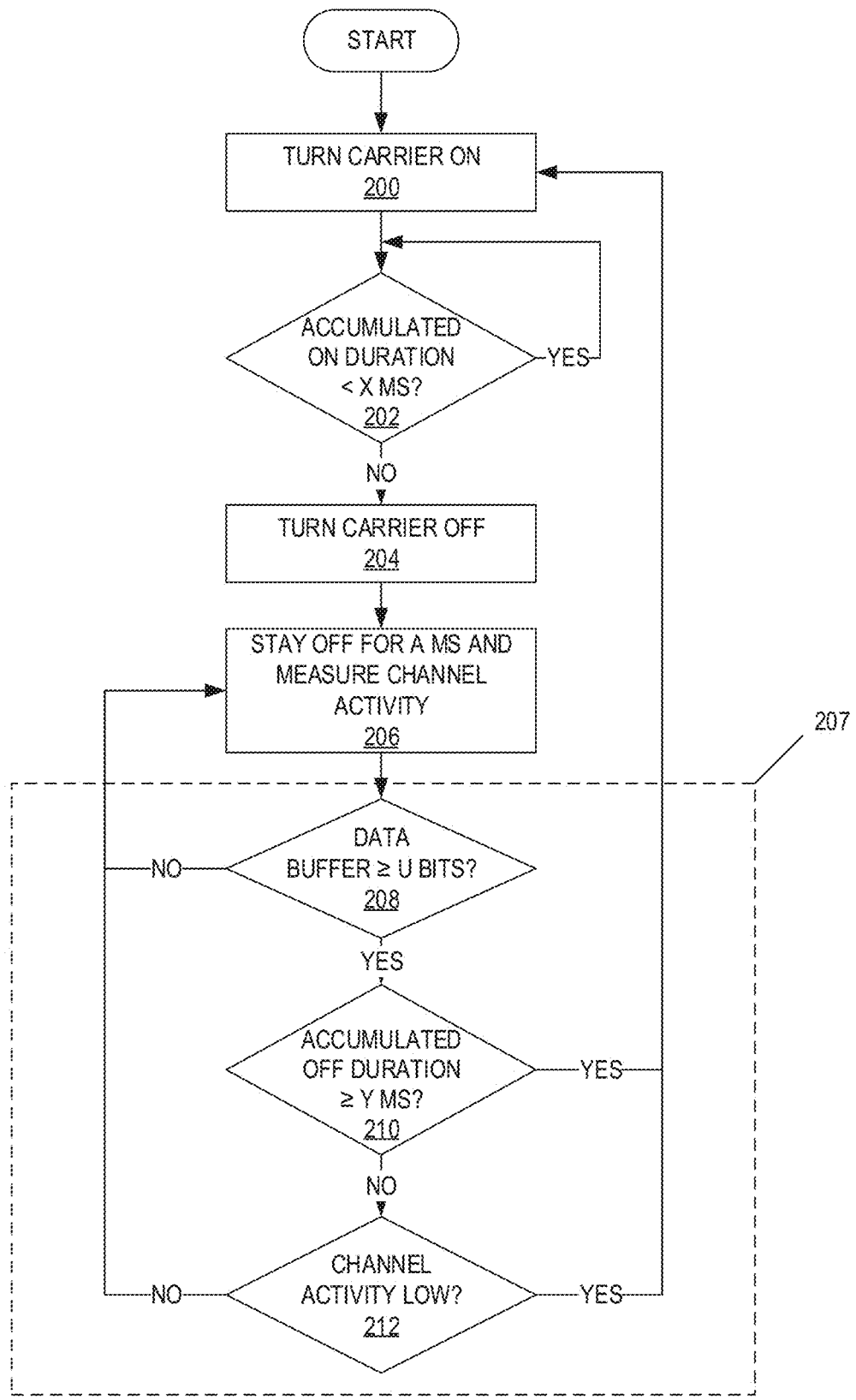
FIG. 9A is a flowchart illustrating a process for controlling ON/OFF operation of a LAA SCell according to some embodiments of the present disclosure.

FIG. 9A is a flowchart illustrating a process for controlling ON/OFF operation of a LAA SCell in which the OFF duration of the LAA SCell is adjusted based on dual adjustment criteria; namely, an amount of buffered data for the LAA SCell (for the downlink and/or the uplink) and an activity level on the channel utilized by the LAA SCell by other wireless technologies according to some embodiments of the present disclosure. For this discussion, the LAA SCell is the LAA SCell 16. This process is performed by, e.g., a network node such as, e.g., the base station 12, but is not limited thereto. Notably, while this process illustrates the use of both the amount of buffered data and the activity level to adjust the OFF duration of the LAA SCell 16, in some alternative embodiments, both of these criteria may not be used (e.g., the process may consider the activity level on the channel but not the amount of buffered data, or vice versa).

As illustrated, the network node maintains the LAA SCell 16 in the ON state for maxOnDuration (shown as X ms) (steps 200 and 202). Specifically, the network node turns the LAA SCell 16 ON (step 200). In other words, the network node turns the LAA SCell carrier ON. The network node then determines whether an accumulated ON duration for the LAA SCell 16 is less than X ms, where X ms is the maxOnDuration (step 202). If so, the network node maintains the LAA SCell 16 in the ON state and continues to monitor the accumulated ON duration for the LAA SCell 16. Once the accumulated ON duration for the LAA SCell 16 is no longer less than X ms (e.g., once the maxOnDuration has expired), the network node turns the LAA SCell 16 OFF (step 204). In other words, the network node turns the LAA SCell carrier OFF.

Once the LAA SCell 16 is in the OFF state, the network node keeps the LAA SCell 16 in the OFF state for a duration of offDurationIncrement (shown as A ms) and monitors the channel utilized by the LAA SCell 16 during this time to measure, or update, an activity level (i.e., one or more activity metrics) for the channel (step 206). In general, the activity level is indicative of the level of activity on the channel by other wireless technologies (e.g., Wi-Fi). The activity level is indicated by one or more channel metrics. The channel metrics can be computed for only this offDurationIncrement or may be computed by averaging over more than one offDurationIncrement.

The network node then determines whether to transition the LAA SCell 16 to the ON state (e.g., prior to the expiration of maxOffDuration) based on the measured channel activity (step 207). More specifically, in the illustrated embodiment, while the LAA SCell 16 is in the OFF state, the network node checks whether the amount of buffered data for the LAA SCell 16 is above the offBufferThreshold (shown as U bits) (step 208). If not, the network node keeps the LAA SCell 16 in the OFF state by returning to step 206. If the amount of buffered data for the LAA SCell 16 is above the offBufferThreshold, the network node checks whether the LAA SCell 16 has been in the OFF state for maxOff-Duration (shown as Y ms) (step 210). In other words, the network node determines whether the accumulated OFF duration for the LAA SCell 16 is greater than or equal to the maxOffDuration. If yes, the network node turns the LAA SCell 16 ON by proceeding to step 200. If no, the network node utilizes the measured channel activity as a decision criterion. In particular, if the channel activity is low (e.g., if the channel activity matric(s) indicate that the activity level on the channel by other wireless technologies is less than a predefined channel activity threshold) (step 212; YES), the network node turns the LAA SCell 16 ON for data transmission by proceeding to step 200. However, if the channel activity is not low (e.g., if the channel activity matric(s) indicate that the activity level on the channel by other wireless technologies is not less than a predefined channel activity threshold) (step 212; NO), the network node keeps the LAA SCell 16 OFF by returning to step 206.

Figure 9B:
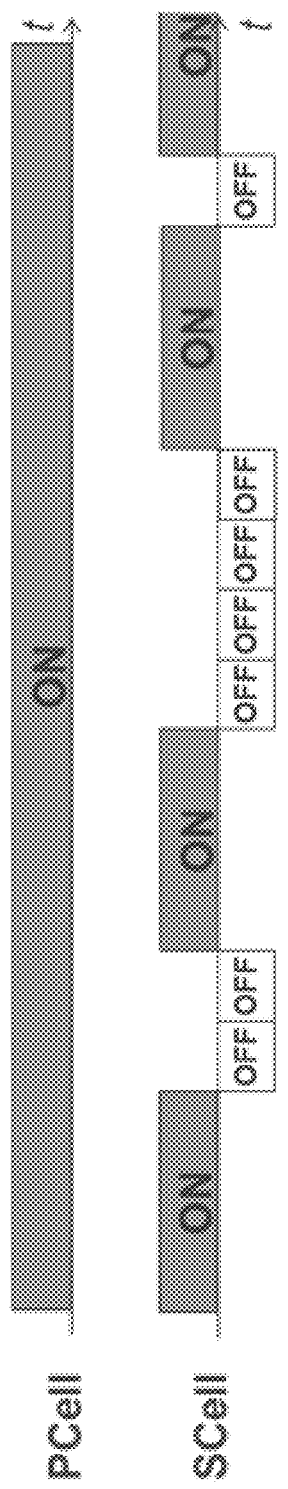
FIG. 9B is a schematic diagram of the ON/OFF operation of a LAA SCell in accordance with the process of FIG. 9A according to some embodiments of the present disclosure.

The dynamic OFF duration adjustment is illustrated in FIG. 9B. The long term average of the LAA SCell 16 ON ratio at higher loads is approximately, $$\frac{maxOnDuration}{maxOnDuration + maxOffDuration}.$$

For instance, if maxOnDuration=100 ms and maxOffDuration=100 ms, then the LAA SCell 16 is in the ON state about 50% on average. If maxOnDuration=100 ms and maxOffDuration=200 ms, then the LAA SCell 16 is in the ON state for circa 33% on average. A non-limiting exemplary setting for offDurationIncrement is 10 ms.

In the embodiments above, the OFF duration is adjusted. In some other embodiments, both the ON duration and the OFF duration are adjusted. In particular, in some other embodiments, the network node additionally adjusts the ON duration based on data buffer status for the LAA SCell 16. The purpose of this scheme is to, e.g., turn the LAA SCell 16 OFF when the network does not necessarily need the LAA SCell 16 for data transmission. This enables better coexistence by leaving more time for other wireless systems to use the channel.

In some embodiments, an onBufferThreshold can be set considering the same factors listed as above for setting the offBufferThreshold. The onBufferThreshold can be set to be different or the same as the offBufferThreshold.

Figure 10:
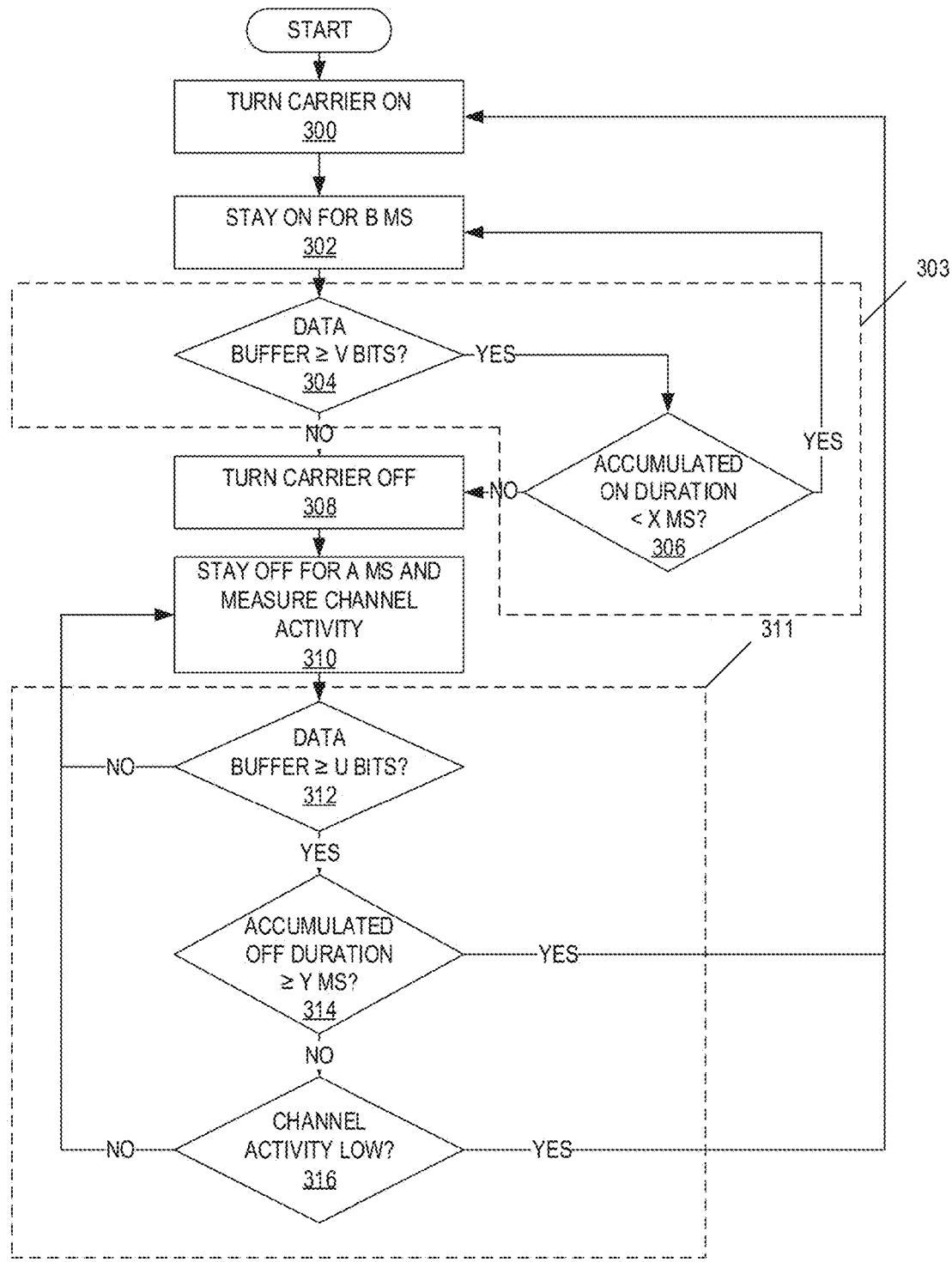
FIG. 10 is a flowchart illustrating a process for controlling ON/OFF operation of a LAA SCell according to some embodiments of the present disclosure.

In this regard, FIG. 10 is a flowchart illustrating a process for controlling ON/OFF operation of a LAA SCell in which the OFF duration of the LAA SCell is adjusted based on dual adjustment criteria; namely, an amount of buffered data for the LAA SCell (for the downlink and/or the uplink) and an activity level on the channel utilized by the LAA SCell by other wireless technologies and the ON duration of the LAA SCell is adjusted based on an amount of buffered data for the LAA SCell according to some embodiments of the present disclosure. For this discussion, the LAA SCell is the LAA SCell 16. This process is performed by, e.g., a network node such as, e.g., the base station 12, but is not limited thereto. Notably, while this process illustrates the use of both the amount of buffered data and the activity level to adjust the OFF duration of the LAA SCell 16, in some alternative embodiments, both of these criteria may not be used (e.g., the process may consider the activity level on the channel but not the amount of buffered data, or vice versa).

As illustrated, the network node turns the LAA SCell 16 ON (step 300). In other words, the network node turns the LAA SCell carrier ON. The network node keeps the LAA SCell 16 ON for an onDurationIncrement (which is illustrated as B ms) (step 302). The network node then determines whether to transition the LAA SCell 16 to the OFF state based on the amount of buffered data (downlink and/or uplink) for the LAA SCell 16 (step 303). More specifically, in this embodiment, the network node checks whether the amount of buffered data for the LAA SCell 16 (downlink and/or uplink) is above the onBufferThreshold (shown as V bits) (step 304). If the amount of buffered data for the LAA SCell 16 is above the onBufferThreshold, the network node checks whether the LAA SCell 16 has been in the ON state for maxOnDuration (shown as X ms) (step 306). In other words, the network node determines whether an accumulated ON duration for the LAA SCell 16 is less than the maxOnDuration. If the accumulated ON duration for the LAA SCell 16 is less than the maxOnDuration (i.e., if the LAA SCell 16 has been in the ON state for maxOnDuration), the network node turns the LAA SCell 16 OFF (step 308). In other words, the network node turns the LAA SCell carrier OFF. However, if the accumulated ON duration for the LAA SCell 16 is not less than the maxOnDuration (i.e., if the LAA SCell 16 has not been in the ON state for maxOnDuration), the network node keeps the LAA SCell 16 ON by returning to step 302. Returning to step 304, if the amount of buffered data is not above the onBufferThreshold, then the network node turns the LAA SCell 16, or the LAA SCell carrier, OFF (step 308).

Once the LAA SCell 16 is in the OFF state, the process proceeds as described above with respect to FIG. 9A. In particular, the network node keeps the LAA SCell 16 in the OFF state for a duration of offDurationIncrement (shown as A ms) and monitors the channel utilized by the LAA SCell 16 during this time to measure, or update, an activity level (i.e., one or more activity metrics) for the channel (step 310). In general, the activity level is indicative of the level of activity on the channel by other wireless technologies (e.g., Wi-Fi). The activity level is indicated by one or more channel metrics. The channel metrics can be computed for only this offDurationIncrement or may be computed by averaging over more than one offDurationIncrement.

The network node then determines whether to transition the LAA SCell 16 to the ON state (e.g., prior to the expiration of maxOffDuration) based on the measured channel activity (step 311). More specifically, in the illustrated embodiment, while the LAA SCell 16 is in the OFF state, the network node checks whether the amount of buffered data for the LAA SCell 16 is above the offBufferThreshold (shown as U bits) (step 312). If not, the network node keeps the LAA SCell 16 in the OFF state by returning to step 310. If the amount of buffered data for the LAA SCell 16 is above the offBufferThreshold, the network node checks whether the LAA SCell 16 has been in the OFF state for maxOff-Duration (shown as Y ms) (step 314). In other words, the network node determines whether the accumulated OFF duration for the LAA SCell 16 is greater than or equal to the maxOffDuration. If yes, the network node turns the LAA SCell 16 ON by proceeding to step 300. If no, the network node utilizes the measured channel activity as a decision criterion. In particular, if the channel activity is low (e.g., if the channel activity matric(s) indicate that the activity level on the channel by other wireless technologies is less than a predefined channel activity threshold) (step 316; YES), the network node turns the LAA SCell 16 ON for data transmission by proceeding to step 300. However, if the channel activity is not low (e.g., if the channel activity matric(s) indicate that the activity level on the channel by other wireless technologies is not less than a predefined channel activity threshold) (step 316; NO), the network node keeps the LAA SCell 16 OFF by returning to step 310.

A non-limiting exemplary setting for onDurationIncrement value is 10 ms. The long term average of SCell ON ratio is generally below, $$\frac{maxOnDuration}{maxOnDuration + maxOffDuration},$$

because the LAA SCell 16 can be turned OFF before the maxOnDuration is exhausted. This lower average ON ratio allows more channel access time to other coexisting wireless systems. If data arrives at the eNB 12 right after the LAA SCell 16 is turned OFF, the eNB 12 needs to wait up to maxOffDuration to turn the LAA SCell 16 ON for data transmission if the channel is heavily used by other wireless systems.

In some other embodiments, the network node additionally adjusts the OFF duration based on whether the LAA SCell 16 has been turned OFF earlier than maxOnDuration in the last ON state. This is referred to as an early turn-off credit. Adjusting the OFF duration with the early turn-off credit reduces the latency in the network and restores the long term average ON ratio.

Figure 11:
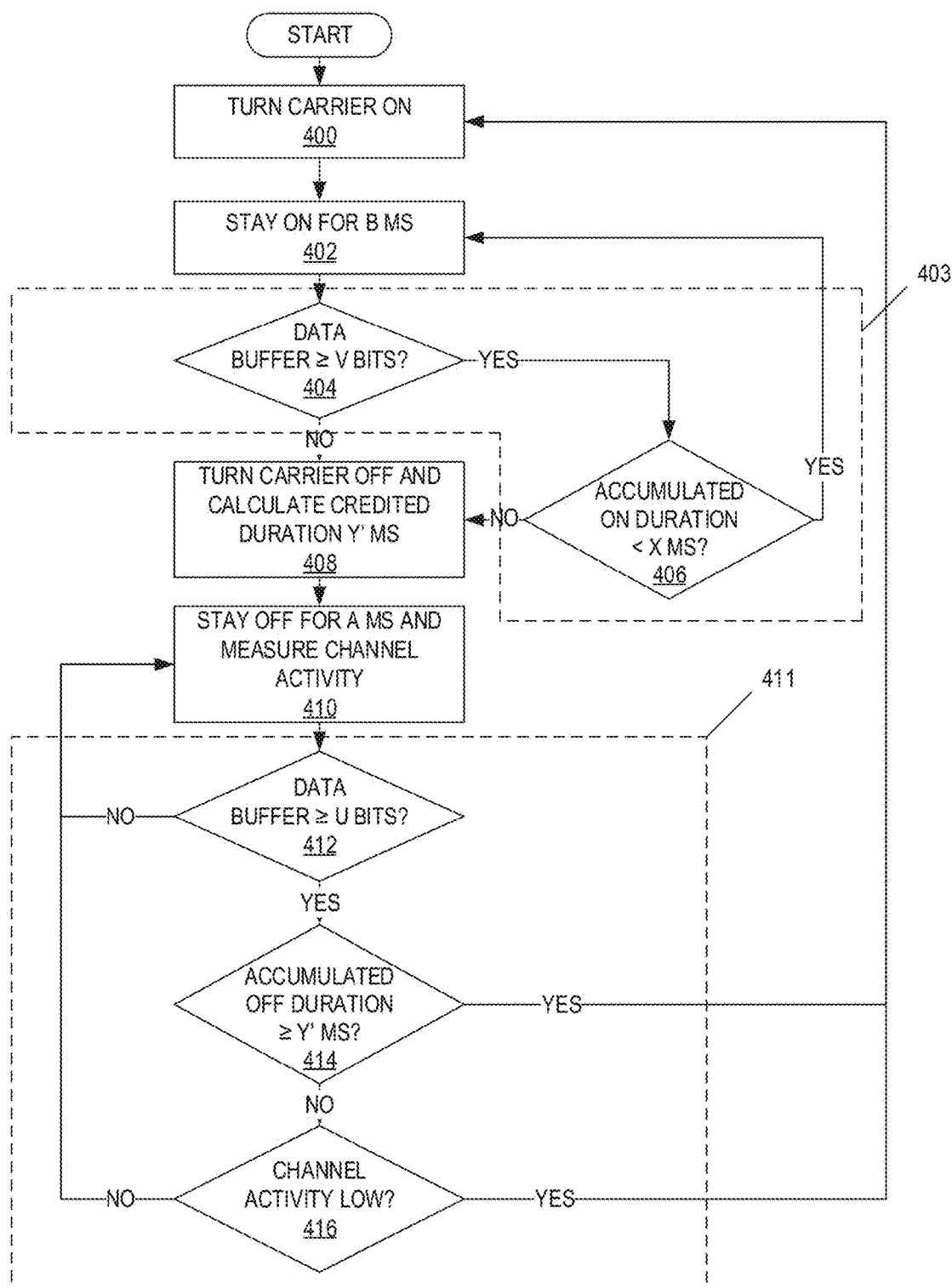
FIG. 11 is a flowchart illustrating a process for controlling ON/OFF operation of a LAA SCell according to some other embodiments of the present disclosure.

In some embodiments, the operation of the network node to determine and apply the early turn-off credit is similar to that of FIG. 10 but where the early turn-off credit is utilized to adjust maxOffDuration. In this regard, FIG. 11 is a flowchart illustrating a process for controlling ON/OFF operation of a LAA SCell that is similar to that of FIG. 10 but applies an early turn-off credit to dynamically adjust maxOffDuration according to some other embodiments of the present disclosure. As illustrated, the network node turns the LAA SCell 16 ON (step 400). In other words, the network node turns the LAA SCell carrier ON. The network node keeps the LAA SCell 16 ON for an onDurationIncrement (which is illustrated as B ms) (step 402). The network node then determines whether to transition the LAA SCell 16 to the OFF state based on the amount of buffered data (downlink and/or uplink) for the LAA SCell 16 (step 403).

More specifically, in this embodiment, the network node checks whether the amount of buffered data for the LAA SCell 16 (downlink and/or uplink) is above the onBufferThreshold (shown as V bits) (step 404). If the amount of buffered data for the LAA SCell 16 is above the onBufferThreshold, the network node checks whether the LAA SCell 16 has been in the ON state for maxOnDuration (shown as X ms) (step 406). In other words, the network node determines whether an accumulated ON duration for the LAA SCell 16 is less than the maxOnDuration. If the accumulated ON duration for the LAA SCell 16 is less than the maxOnDuration (i.e., if the LAA SCell 16 has been in the ON state for maxOnDuration), the network node turns the LAA SCell 16 OFF, or turns the LAA SCell carrier OFF, and calculates a credited maxOffDuration, or calculatedMaxOffDuration, (which is illustrated as Y' ms) (step 408). However, if the accumulated ON duration for the LAA SCell 16 is not less than the maxOnDuration (i.e., if the LAA SCell 16 has not been in the ON state for maxOnDuration), the network node keeps the LAA SCell 16 ON by returning to step 402. Returning to step 404, if the amount of buffered data is not above the onBufferThreshold, then the network node turns the LAA SCell 16, or the LAA SCell carrier, OFF and calculates a credited maxOffDuration (which is illustrated as Y' ms) (step 408).

In step 408, when the LAA SCell 16 is turned OFF, the accumulated ON duration is recorded as lastOnDuration. A new maximum OFF duration is calculated considering the possible credit from turning the LAA SCell 16 OFF earlier than maxOnDuration. More specifically, the network node calculates the calculatedMaxOffDuration (shown as Y' ms) as follows:

calculatedMaxOffDuration=maxOffDuration−W·(maxOnDuration−lastOnDuration), where W is a weighting factor for governing the turn-off credit used in the maximum OFF duration adjustment. Thus, the calculatedMaxOffDuration is inversely related to the difference between maxOnDuration and lastOnDuration. For instance, if W=1, full turn-off credit is given to shorten the maximum OFF duration. For instance, if maxOnDuration=100 ms, maxOffDuration=100 ms and lastOnDuration=60 ms, then the LAA SCell 16 can be turned back ON no later than 60 ms if the network needs the LAA SCell 16 for data transmission. The credit weighting factor takes on values between 0 and 1, with 1 giving the full credit. If W=0, the embodiment of FIG. 11 reduces to the embodiment of FIG. 10. The weight W is predefined and may be configurable, e.g., by the network or by the network operator.

Once the LAA SCell 16 is in the OFF state, the process proceeds substantially as described above with respect to FIGS. 9A and 10. In particular, the network node keeps the LAA SCell 16 in the OFF state for a duration of offDurationIncrement (shown as A ms) and monitors the channel utilized by the LAA SCell 16 during this time to measure, or update, an activity level (i.e., one or more activity metrics) for the channel (step 410). In general, the activity level is indicative of the level of activity on the channel by other wireless technologies (e.g., Wi-Fi). The activity level is indicated by one or more channel metrics. The channel metrics can be computed for only this offDurationIncrement or may be computed by averaging over more than one offDurationIncrement.

The network node then determines whether to transition the LAA SCell 16 to the ON state (e.g., prior to the expiration of calculatedMaxOffDuration) based on the measured channel activity (step 411). More specifically, in the illustrated embodiment, while the LAA SCell 16 is in the OFF state, the network node checks whether the amount of buffered data for the LAA SCell 16 is above the offBufferThreshold (shown as U bits) (step 412). If not, the network node keeps the LAA SCell 16 in the OFF state by returning to step 410. If the amount of buffered data for the LAA SCell 16 is above the offBufferThreshold, the network node checks whether the LAA SCell 16 has been in the OFF state for calculatedMaxOffDuration (shown as Y' ms) (step 414). In other words, the network node determines whether the accumulated OFF duration for the LAA SCell 16 is greater than or equal to the calculatedMaxOffDuration. If yes, the network node turns the LAA SCell 16 ON by proceeding to step 400. If no, the network node utilizes the measured channel activity as a decision criterion. In particular, if the channel activity is low (e.g., if the channel activity matric(s) indicate that the activity level on the channel by other wireless technologies is less than a predefined channel activity threshold) (step 416; YES), the network node turns the LAA SCell 16 ON for data transmission by proceeding to step 400. However, if the channel activity is not low (e.g., if the channel activity matric(s) indicate that the activity level on the channel by other wireless technologies is not less than a predefined channel activity threshold) (step 416; NO), the network node keeps the LAA SCell 16 OFF by returning to step 410.

In some other embodiments, the OFF and ON durations are adjusted based on whether the LAA SCell 16 has been turned OFF earlier than maxOnDuration in the last ON state. This scheme allows network to keep its LAA SCell 16 in the ON state extendedly while there is data in the buffer utilizing the turn-off credit. The turn-off credit is acquired by network in the past by switching to OFF state earlier when data buffer has exhausted. Extending the ON state beyond the maxOnDuration when the LAA SCell 16 has data in its buffer allows lower latency and helps in restoring the long term average ON ratio.

Figure 12:
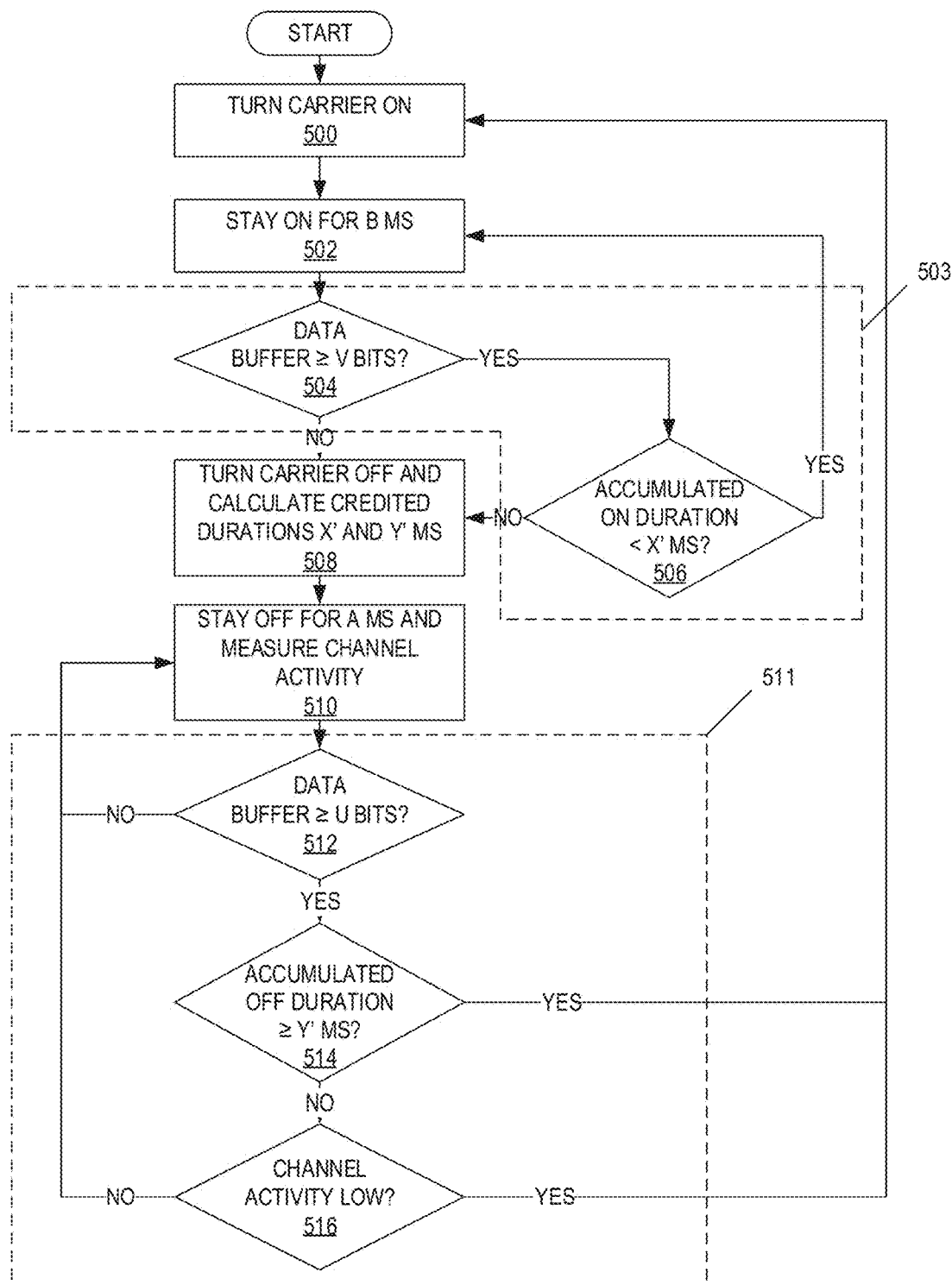
FIG. 12 is a flowchart illustrating a process for controlling ON/OFF operation of a LAA SCell according to some other embodiments of the present disclosure.

In this regard, FIG. 12 is a flowchart illustrating a process for controlling ON/OFF operation of a LAA SCell that is similar to that of FIG. 11 but applies an early turn-off credit to dynamically adjust both maxOnDuration and maxOffDuration according to some other embodiments of the present disclosure. As illustrated, the network node turns the LAA SCell 16 ON (step 500). In other words, the network node turns the LAA SCell carrier ON. The network node keeps the LAA SCell 16 ON for an onDurationIncrement (which is illustrated as B ms) (step 502). The network node then determines whether to transition the LAA SCell 16 to the OFF state based on the amount of buffered data (downlink and/or uplink) for the LAA SCell 16 (step 503).

More specifically, in this embodiment, the network node checks whether the amount of buffered data for the LAA SCell 16 (downlink and/or uplink) is above the onBufferThreshold (shown as V bits) (step 504). If the amount of buffered data for the LAA SCell 16 is above the onBufferThreshold, the network node checks whether the LAA SCell 16 has been in the ON state for calculatedMaxOnDuration (shown as X' ms) (step 506). In other words, the network node determines whether an accumulated ON duration for the LAA SCell 16 is less than the calculatedMaxOnDuration. Here, the calculatedMaxOnDuration is a value calculated during the previous ON state processing. Initially, the calculatedMaxOnDuration may be initialized to maxOnDuration.

If the accumulated ON duration for the LAA SCell 16 is less than the calculatedMaxOnDuration (i.e., if the LAA SCell 16 has been in the ON state for calculatedMaxOnDuration), the network node turns the LAA SCell 16 OFF, or turns the LAA SCell carrier OFF, and calculates a credited maxOnDuration (i.e., calculatedMaxOnDuration) which is illustrated as X' ms and a credited maxOffDuration (i.e., calculatedMaxOffDuration) which is illustrated as Y' ms (step 508). However, if the accumulated ON duration for the LAA SCell 16 is not less than the calculatedMaxOnDuration (i.e., if the LAA SCell 16 has not been in the ON state for calculatedMaxOnDuration), the network node keeps the LAA SCell 16 ON by returning to step 502. Returning to step 504, if the amount of buffered data is not above the onBufferThreshold, then the network node turns the LAA SCell 16, or the LAA SCell carrier, OFF and calculates a credited maxOnDuration (i.e., calculatedMaxOnDuration) which is illustrated as X' ms and a credited maxOffDuration (i.e., calculatedMaxOffDuration) which is illustrated as Y' ms (step 508).

In step 508, when the LAA SCell 16 is turned OFF, the accumulated ON duration is recorded as lastOnDuration. A new maximum OFF duration is calculated considering the possible credit from turning the LAA SCell 16 OFF earlier than maxOnDuration. More specifically, the network node calculates the calculatedMaxOffDuration (shown as Y' ms) as follows:

$$\text{calculatedMaxOffDuration} = \text{maxOffDuration} - W_1 \cdot (\text{maxOnDuration} - \text{lastOnDuration}),$$

where $W_1$ is a weighting factor to control how much turn-off credit is to be used in the maximum OFF duration adjustment. The network node calculates the calculatedMaxOnDuration (shown as X' ms) as follows:

$$\text{calculatedMaxOnDuration} = \text{maxOnDuration} + W_2 \cdot (\text{maxOnDuration} - \text{lastOnDuration}),$$

where $W_2$ is a weight to control how much early turn-off credit is used in the maximum ON duration adjustment. Thus, the calculatedMaxOffDuration is inversely related to the difference between maxOnDuration and lastOnDuration. Conversely, the calculatedMaxOnDuration is directly related to the difference between maxOnDuration and lastOnDuration. For instance, if $W_1=0$ and $W_2=1$, full turn-off credit is given to lengthen the maximum ON duration. For instance, if maxOnDuration=100 ms, maxOffDuration=100 ms and lastOnDuration=60 ms, then the LAA SCell 16 can be stay ON for up to 140 ms if the network needs the LAA SCell 16 for data transmission. The credit weights can take on values between 0 and 1. Using different combination of $W_1$ and $W_2$ allows the early turn-off credit to be given to different combinations of OFF and ON duration adjustments. In order to be fair to other coexisting technologies, the sum of the weights should follow a bound, $W_1+W_2<1$. The weights $W_1$ and $W_2$ are predefined and may be configurable, e.g., by the network or by the network operator.

Once the LAA SCell 16 is in the OFF state, the process proceeds as described above with respect to FIG. 11. In particular, the network node keeps the LAA SCell 16 in the OFF state for a duration of offDurationIncrement (shown as A ms) and monitors the channel utilized by the LAA SCell 16 during this time to measure, or update, an activity level (i.e., one or more activity metrics) for the channel (step 510). In general, the activity level is indicative of the level of activity on the channel by other wireless technologies (e.g., Wi-Fi). The activity level is indicated by one or more channel metrics. The channel metrics can be computed for only this offDurationIncrement or may be computed by averaging over more than one offDurationIncrement.

The network node then determines whether to transition the LAA SCell 16 to the ON state (e.g., prior to the expiration of calculatedMaxOffDuration) based on the measured channel activity (step 511). More specifically, in the illustrated embodiment, while the LAA SCell 16 is in the OFF state, the network node checks whether the amount of buffered data for the LAA SCell 16 is above the offBufferThreshold (shown as U bits) (step 512). If not, the network node keeps the LAA SCell 16 in the OFF state by returning to step 510. If the amount of buffered data for the LAA SCell 16 is above the offBufferThreshold, the network node checks whether the LAA SCell 16 has been in the OFF state for calculatedMaxOffDuration (shown as Y' ms) (step 514). In other words, the network node determines whether the accumulated OFF duration for the LAA SCell 16 is greater than or equal to the calculatedMaxOffDuration. If yes, the network node turns the LAA SCell 16 ON by proceeding to step 500. If no, the network node utilizes the measured channel activity as a decision criterion. In particular, if the channel activity is low (e.g., if the channel activity matric(s) indicate that the activity level on the channel by other wireless technologies is less than a predefined channel activity threshold) (step 516; YES), the network node turns the LAA SCell 16 ON for data transmission by proceeding to step 500. However, if the channel activity is not low (e.g., if the channel activity matric(s) indicate that the activity level on the channel by other wireless technologies is not less than a predefined channel activity threshold) (step 516; NO), the network node keeps the LAA SCell 16 OFF by returning to step 510.

Figure 13:
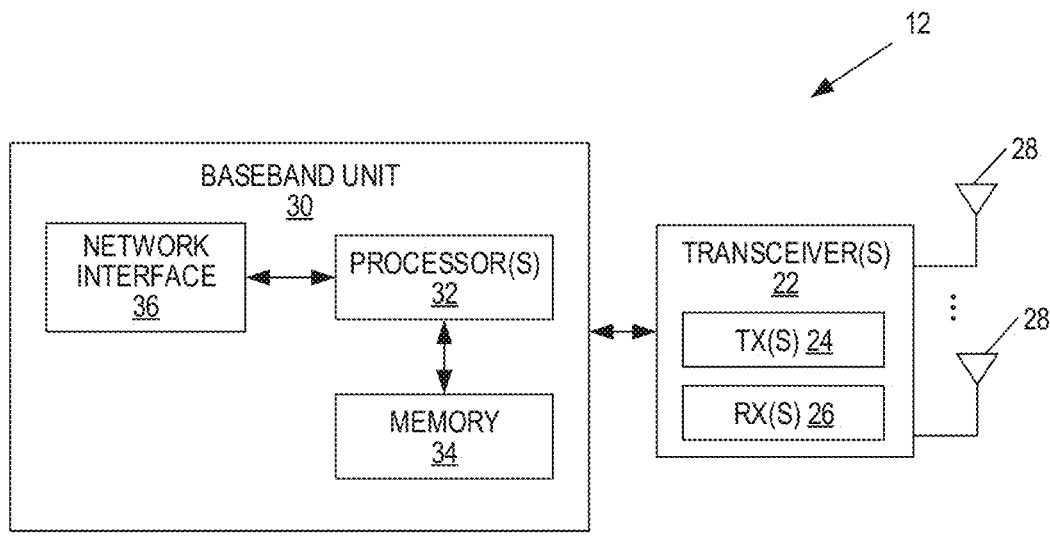
FIG. 13 is a schematic diagram of a base station in accordance with embodiments of the present disclosure.

FIG. 13 is a schematic diagram of a base station 12 in accordance with embodiments of the present disclosure. The base station 12 can be an LTE base station (an eNB or a PCell base station) or another type of base station that can communicate wirelessly with user equipment (a SCell radio station operating in unlicensed spectrum). The base station 12 includes a transceiver(s) 22 (which includes a transmitter (s) 24 and a receiver(s) 26 coupled to antenna(s) 28) and a baseband unit 30 including a processor(s) 32 (e.g., Central Processing Unit(s) (CPU(s)), Application Specific Integrated Circuit(s) (ASIC(s)), and/or Field Programmable Gate Array(s) (FPGA(s))), a memory 34, and a network interface 36. The transceiver 22 allows the base station 12 to send and receive wireless signals. The processor(s) 32 can execute instructions stored in the memory 34 based on signals received wirelessly via the transceiver 22. The network interface 36 allows the base station 12 to interact with the core network 20 (not shown), such as sending and receiving signals from a wired link. The base station 12 can communicate wirelessly with one or more UEs 18.

In some embodiment, a computer program including instructions which, when executed by at least one processor, causes the at least one processor to carry out the functionality of the base station 12 (or more generally network node) according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 34).

Figure 14:
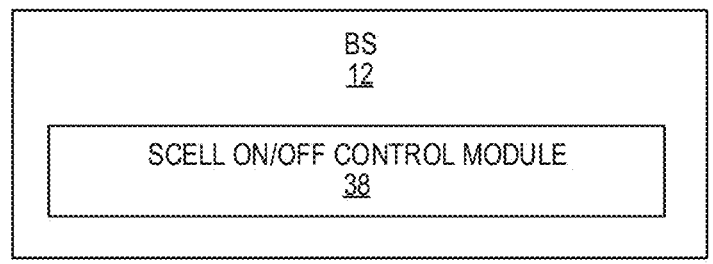
FIG. 14 is a schematic diagram of a base station in accordance with some other embodiments of the present disclosure.

FIG. 14 is a schematic diagram of a base station 12 (or more generally a network node) according to some embodiments of the present disclosure. As illustrated, the base station 12 includes a SCell ON/OFF control module 38, which is implemented in software. The SCell ON/OFF control module 38 operates to control the ON/OFF operation of a SCell(s) 16 according to any of the embodiments described herein.

The following acronyms are used throughout this disclosure.

| | |
|---|---|
| μs | Microsecond |
| 3GPP | Third Generation Partnership Project |
| AP | Access Point |
| ASIC | Application Specific Integrated Circuit |
| CA | Carrier Aggregation |
| CC | Component Carrier |
| CFI | Control Format Indicator |
| CPU | Central Processing Unit |
| CQI | Channel Quality Information |
| CRS | Cell Specific Reference Symbol |
| CSI | Channel State Information |
| CSMA/CA | Carrier Sense Multiple Access with Collision Avoidance |
| DFT | Discrete Fourier Transform |
| eNB | Enhanced or Evolved Node B |
| FPGA | Field Programmable Gate Array |
| GHz | Gigahertz |
| LAA | Licensed Assisted Access |
| LBT | Listen-Before-Talk |
| LTE | Long Term Evolution |
| MAC | Medium Access Control |
| MHz | Megahertz |
| ms | Millisecond |
| OFDM | Orthogonal Frequency Division Multiplexing |
| PCell | Primary Cell |
| RRC | Radio Resource Control |
| RRH | Remote Radio Head |
| SCell | Secondary Cell |
| SC-FDMA | Single Carrier Frequency Division Multiple Access |
| UE | User Equipment |
| WLAN | Wireless Local Area Network |

Those skilled in the art will recognize improvements and modifications to the embodiments of the present disclosure. All such improvements and modifications are considered within the scope of the concepts disclosed herein and the claims that follow.

What is claimed is:

1. A method of operation of a network node in a cellular communications network to dynamically control ON/OFF operation of a Secondary Cell, SCell, of the cellular communications network, comprising:

measuring activity of other wireless systems on a channel utilized by the SCell during an OFF duration increment, the OFF duration increment being less than a maximum OFF duration;

determining whether to transition the SCell from an OFF state to an ON state based on the activity of the other wireless systems measured on the channel by:

determining whether an amount of data buffered for the SCell is greater than or equal to a predefined buffered data threshold;

determining whether an accumulated OFF duration for the SCell is greater than or equal to the maximum OFF duration; and determining whether the activity of the other wireless systems on the channel is less than a predefined channel activity threshold;

turning the SCell ON upon determining that; (i) the amount of data buffered for the SCell is greater than or equal to the predefined buffered data threshold and (ii) either the accumulated OFF duration for the SCell is greater than or equal to the maximum OFF duration or the activity of the other wireless systems on the channel is less than the predefined channel activity threshold; and keeping the SCell in the OFF state for an additional OFF duration increment upon determining that the accumulated OFF duration for the SCell is not greater than or equal to the maximum OFF duration and the activity of the other wireless systems on the channel is not less than the predefined channel activity threshold.

2. The method of claim 1 wherein the SCell is a License Assisted Access, LAA, SCell that operates in an unlicensed frequency band.

3. The method of claim 2 wherein measuring the activity of the other wireless systems on the channel comprises measuring an average received energy for the channel.

4. The method of claim 2 wherein measuring the activity of the other wireless systems on the channel comprises measuring a channel occupancy ratio for the channel.

5. The method of claim 2 wherein determining whether to transition the SCell to the ON state comprises determining whether to transition the SCell to the ON state based on the activity of the other wireless systems measured on the channel and the amount of data buffered for the SCell.

6. The method of claim 5 wherein determining whether to transition the SCell to the ON state based on the activity of the other wireless systems measured on the channel and the amount of data buffered for the SCell is such that a determination is made to transition the SCell to the ON state if the amount of data buffered for the SCell is greater than or equal to the predefined buffered data threshold and the activity of the other wireless systems measured on the channel is less than the predefined channel activity threshold.

7. The method of claim 2 wherein determining whether to transition the SCell to the ON state comprises determining whether to transition the SCell to the ON state based on the activity of the other wireless systems measured on the channel, the amount of data buffered for the SCell, and a static maximum OFF duration.

8. The method of claim 2 wherein determining whether to transition the SCell to the ON state comprises determining whether to transition the SCell to the ON state based on the activity of the other wireless systems measured on the channel, the amount of data buffered for the SCell, and a dynamic maximum OFF duration.

9. The method of claim 8 wherein the dynamic maximum OFF duration is a function of whether an immediately preceding ON duration of the SCell was ended prior to a maximum ON duration.

10. The method of claim 2 further comprising, while the SCell is in the ON state:
    determining whether an accumulated ON duration for the SCell is less than a maximum ON duration; and
    turning the SCell OFF upon determining that the accumulated ON duration for the SCell is not less than the maximum ON duration.

11. The method of claim 2 further comprising, while the SCell is in the ON state:
    determining whether to transition the SCell to the OFF state based on the amount of data buffered for the SCell and an accumulated ON duration of the SCell;
    turning the SCell OFF upon determining that that SCell is to be transitioned to the OFF state; and
    keeping the SCell in the ON state upon determining that the SCell is not to be transitioned to the OFF state.

12. The method of claim 1 further comprising repeating the steps of measuring the activity of the other wireless systems on the channel and determining whether to transition the SCell to the ON state for the additional OFF duration increment.

13. The method of claim 1 wherein the maximum OFF duration is static.

14. The method of claim 1 further comprising, while the SCell is in the ON state:
    determining whether an accumulated ON duration for the SCell is less than a maximum ON duration; and
    turning the SCell OFF upon determining that the accumulated ON duration for the SCell is not less than the maximum ON duration.

15. The method of claim 1 further comprising, while the SCell is in the ON state:
    determining whether the amount of data buffered for the SCell is greater than or equal to a predefined ON state buffered data threshold;
    upon determining that the amount of data buffered for the SCell is greater than or equal to the predefined ON state buffered data threshold, determining whether an accumulated ON duration for the SCell is less than a maximum ON duration;
    turning the SCell OFF upon determining that either: (i) the amount of data buffered for the SCell is not greater than or equal to the predefined ON state buffered data threshold or (ii) the accumulated ON duration for the SCell is not less than the maximum ON duration; and
    keeping the SCell in the ON state upon determining that the amount of data buffered for the SCell is greater than or equal to the predefined ON state buffered data threshold and the accumulated ON duration for the SCell is less than the maximum ON duration.

16. The method of claim 1 further comprising, while the SCell is in the ON state:
    determining whether the amount of data buffered for the SCell is greater than or equal to a predefined ON state buffered data threshold;
    upon determining that the amount of data buffered for the SCell is greater than or equal to the predefined ON state buffered data threshold, determining whether an accumulated ON duration for the SCell is less than a maximum ON duration;
    turning the SCell OFF and calculating the maximum OFF duration for the SCell upon determining that either: (i) the amount of data buffered for the SCell is not greater than or equal to the predefined ON state buffered data threshold or (ii) the accumulated ON duration for the SCell is not less than the maximum ON duration, the maximum OFF duration being calculated such that the maximum OFF duration is inversely related to a difference between the maximum ON duration and the accumulated ON duration for the SCell upon turning the SCell OFF; and
    keeping the SCell in the ON state upon determining that the amount of data buffered for the SCell is greater than or equal to the predefined ON state buffered data threshold and the accumulated ON duration for the SCell is less than the maximum ON duration.

17. The method of claim 1 further comprising, while the SCell is in the ON state:
    determining whether the amount of data buffered for the SCell is greater than or equal to a predefined ON state buffered data threshold;
    upon determining that the amount of data buffered for the SCell is greater than or equal to the predefined ON state buffered data threshold, determining whether an accumulated ON duration for the SCell is less than a maximum ON duration;
    turning the SCell OFF and calculating a new maximum ON duration for the SCell and a new maximum OFF duration for the SCell upon determining that either: (i) the amount of data buffered for the SCell is not greater than or equal to the predefined ON state buffered data threshold or (ii) the accumulated ON duration for the SCell is not less than the maximum ON duration, the new maximum ON duration being calculated such that the new maximum ON duration is directly related to a difference between the maximum ON duration and the accumulated ON duration for the SCell upon turning the SCell OFF and the new maximum OFF duration being calculated such that the new maximum OFF duration is inversely related to the difference between the maximum ON duration and the accumulated ON duration for the SCell upon turning the SCell OFF; and
keeping the SCell in the ON state upon determining that the amount of data buffered for the SCell is greater than or equal to the predefined ON state buffered data threshold and the accumulated ON duration for the SCell is less than the new maximum ON duration.

18. A network node for operation in a cellular communications network configured to dynamically control ON/OFF operation of a Secondary Cell; SCell, of the cellular communications network, comprising:
at least one processor; and
memory containing instructions executable by the at least one processor whereby the network node is operable to:
measure activity of other wireless systems on a channel utilized by the SCell during an OFF duration increment; the OFF duration increment being less than a maximum OFF duration:
determine whether to transition the SCell from an OFF state to an ON state based on the activity of the other wireless systems measured on the channel by being operable to:
determine whether an amount of data buffered for the SCell is greater than or equal to a predefined buffered data threshold;
determine whether an accumulated OFF duration for the SCell is greater than or equal to the maximum OFF duration; and
determine whether the activity of the other wireless systems on the channel is less than a predefined channel activity threshold;
turn the SCell ON upon determining that: (i) the amount of data buffered for the SCell is greater than or equal to the predefined buffered data threshold and (ii) either the accumulated OFF duration for the SCell is greater than or equal to the maximum OFF duration or the activity of the other wireless systems on the channel is less than the predefined channel activity threshold; and
keep the SCell in the OFF state for an additional OFF duration increment upon determining that the accumulated OFF duration for the SCell is not greater than or equal to the maximum OFF duration and the activity of the other wireless systems on the channel is not less than the predefined channel activity threshold.

19. The network node of claim 17 wherein the SCell is a License Assisted Access, LAA, SCell that operates in an unlicensed frequency band.

20. The network node of claim 17 wherein the maximum OFF duration is dynamic and is a function of whether an immediately preceding ON duration of the SCell was ended prior to a maximum ON duration.

* * * * *